United States Patent
Cheng

(10) Patent No.: US 6,382,652 B1
(45) Date of Patent: May 7, 2002

(54) STANDING DEVICE FOR A COLLAPSIBLE STROLLER

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 0 days.

(21) Appl. No.: 09/591,671

(22) Filed: Jun. 12, 2000

(51) Int. Cl.⁷ .................................................. B62B 9/00
(52) U.S. Cl. ..................... 280/293; 280/295; 280/642; 280/763.1; 248/230.5
(58) Field of Search .......................... 280/47.2, 47.33, 280/293–304, 304.5, 642, 643, 647, 650, 761, 763.1, DIG. 6; 248/226.11, 230.5, 230.6, 676, 677

(56) References Cited

U.S. PATENT DOCUMENTS

| | | | |
|---|---|---|---|
| 571,979 A | * 11/1896 | Otto | 280/301 |
| 642,144 A | * 1/1900 | Mellish | 280/303 |
| 969,920 A | * 9/1910 | Taylor | 280/296 |
| 1,509,022 A | * 9/1924 | Noble | 248/230.5 |
| 1,761,679 A | * 6/1930 | Quickert | 280/295 |
| 5,489,030 A | * 2/1996 | Kolbeck et al. | 280/303 |
| 5,519,919 A | * 5/1996 | Lee | 280/47.2 |
| 5,725,238 A | * 3/1998 | Huang | 280/302 |
| 6,168,180 B1 | * 1/2001 | Egloff | 280/295 |
| 6,273,451 B1 | * 8/2001 | Julien et al. | 280/650 |

* cited by examiner

*Primary Examiner*—J. J. Swann
*Assistant Examiner*—Christopher Bottorff
(74) *Attorney, Agent, or Firm*—Flehr Hohbach Test Albritton & Herbert LLP

(57) ABSTRACT

The present invention relates to a standing device for a stroller having an upper cross bar, a lower cross bar, and two rear wheels includes a pivotal rod having a first end and a second end respectively provided with a first C-shaped tube holder and a second C-shaped tube holder and a pivotal frame having a first end provided with a third C-shaped tube holder and a second end defined with a pivotal pin having a radial stop boss slanting to the first end of the frame. The second C-shaped tube holder of the pivotal rod is pivotally connected to the pivotal pin of the pivotal frame. The first C-shaped tube holder of the pivotal rod and the third C-shaped tube holder of the pivotal frame are respectively connected to the lower crossing bar and the upper cross bar such that the pivotal rod and the pivotal frame fold and support the stroller in cooperation with the rear wheels of the stroller when the stroller is in a collapsed and upright position.

4 Claims, 4 Drawing Sheets

PRIOR ART

STANDING DEVICE FOR A COLLAPSIBLE STROLLER

FIELD OF THE INVENTION

The present invention generally relates to a standing means, and more particularly to a standing device for a collapsible stroller.

BACKGROUND OF THE INVENTION

In a commonly assigned co-pending U.S. patent application Ser. No. 09/483,793, filed on Jan. 14, 2000, a standing device for keeping a collapsed stroller in an upright stable position is described. Referring to FIG. 4, the standing device 100 includes a pivotal bar 120, a connecting pole 130 and a supporting plate 140. As four plastic catches 142, 144, 146, and 148 are used to secure the connecting pole 130 onto the supporting plate 140, this makes not only the manufacture of the standing device complicated but also a connection between the pivotal bar 120 and the supporting plate 140 susceptible to break.

The disclosure of co-pending application Ser. No. 09/483,793 is incorporated by reference into the present disclosure.

SUMMARY OF THE INVENTION

Therefore, it is an object of the present invention to provide a standing device for a collapsed stroller which overcomes the above-described disadvantage caused by the standing device in the co-pending application.

Another object of the invention is to provide a standing device for a collapsible stroller with a simple and durable structure such that a consumer may install the standing device with ease.

In accordance with the illustrative embodiment of the present invention, a standing device for a stroller having an upper cross bar, a lower cross bar, and two rear wheels includes a pivotal rod having a first end and a second end respectively provided with a first C-shaped tube holder and a second C-shaped tube holder and a pivotal frame having a first end provided with a third C-shaped tube holder and a second end defined with a pivotal pin having a radial stop boss slanting to the first end of the frame. The second C-shaped tube holder of the pivotal rod is pivotally connected to the pivotal pin of the pivotal frame. The first C-shaped tube holder of the pivotal rod and the third C-shaped tube holder of the pivotal frame are respectively connected to the lower crossing bar and the upper cross bar such that the pivotal rod and the pivotal frame fold and support the stroller in cooperation with the rear wheels of the stroller when the stroller is in a collapsed and upright position.

BRIEF DESCRIPTION OF THE DRAWINGS

A complete understanding of the present invention may be gained by considering the following detailed description in conjunction with the accompanying drawings, in which.

DETAILED DESCRIPTION OF THE INVENTION

Reference will now be made in detail to the preferred embodiment of the invention, examples of which are illustrated in the accompanying drawings. Throughout the description, like elements will be referred to by corresponding reference numbers.

Figure 1:
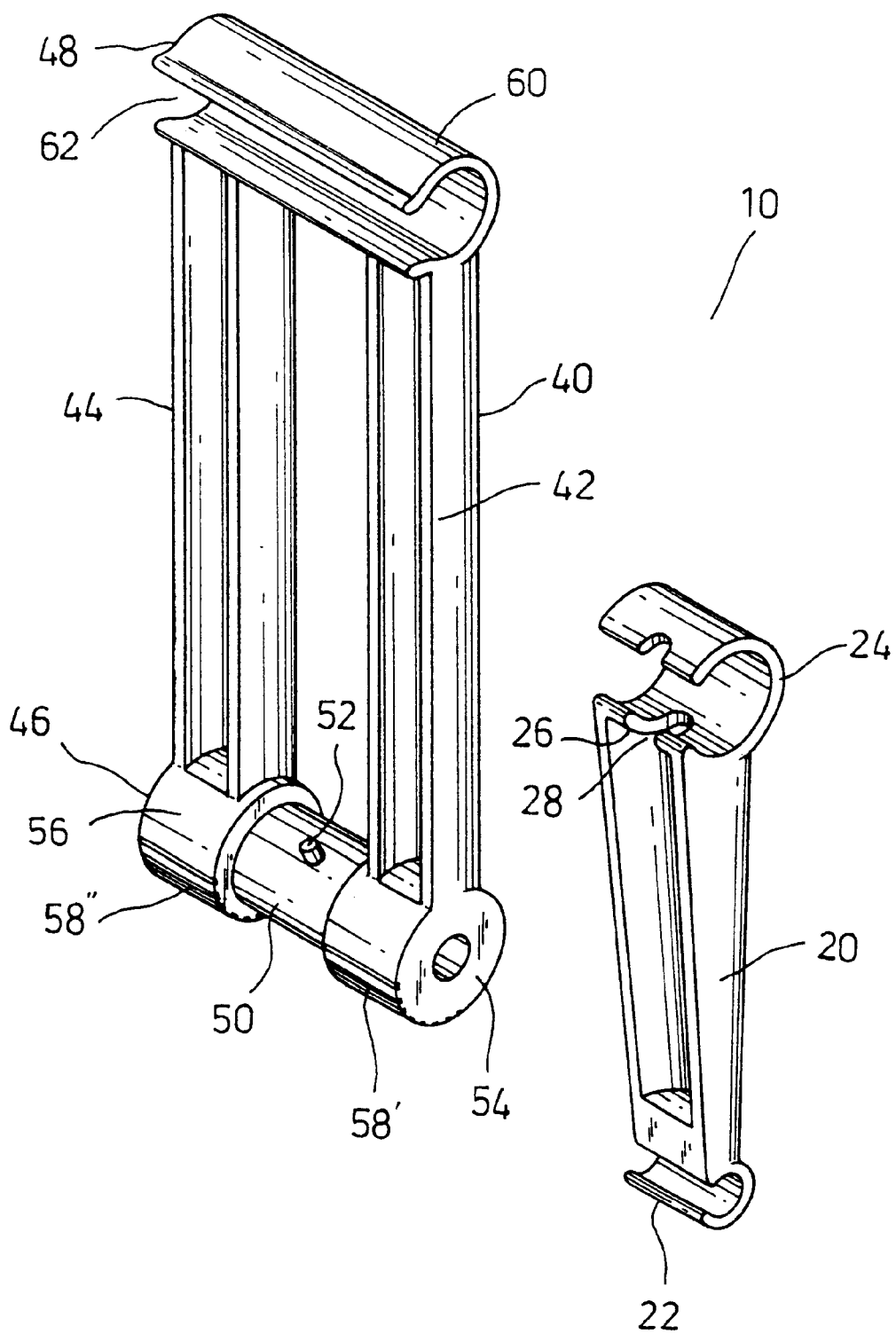
FIG. 1 shows a perspective exploded view of a standing device in accordance with a first embodiment of the present invention.
Figure 2:
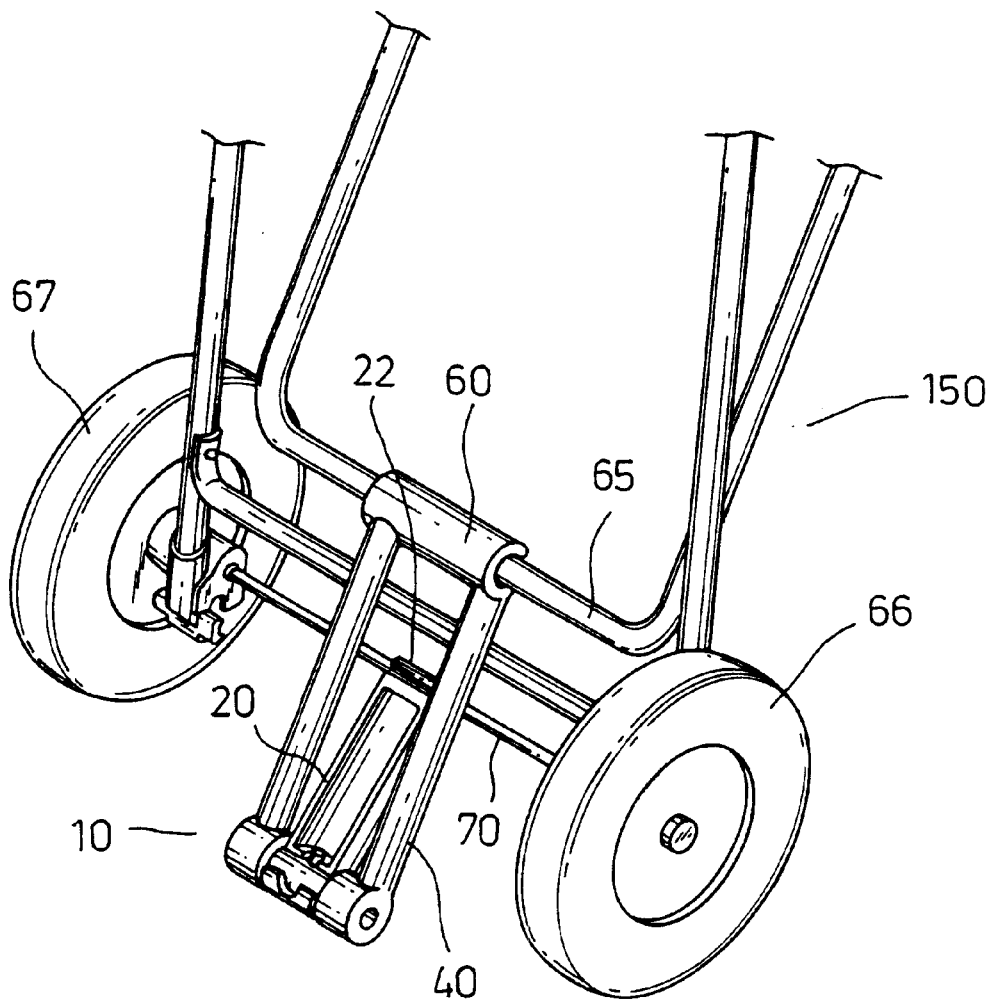
FIG. 2 shows a perspective view of the standing device of FIG. 1 when it is assembled to a partially-shown stroller in a collapsed position.

FIG. 1 is a perspective exploded view of a standing device 10 in accordance with the present invention for used in a stroller 150 partially shown in FIG. 2. In FIG. 1, the standing device 10 includes a pivotal rod 20 and a pivotal frame 40 each of which is constructed of a flexible and strong material. The pivotal rod 20 has a first end provided with a first C-shaped tube holder 22 and a second end provided with a second C-shaped tube holder 24. The C-shaped tube holder 24 further defines a groove 28 on a wall 26 abutting to the pivotal rod 20.

The pivotal frame 40 is substantially rectangular in shape with two pairs of oppositely-faced longer beams 42, 44 and shorter beams 46, 48. The beam 48 is referred as a first end while the beam 46 is referred as a second end. As shown, a pivotal pin 50 is defined at the shorter beam 46. The pivotal pin 50 has a diameter sized to be pivotally received by the C-shaped tube holder 24 of the pivotal rod 20. As mentioned, the C-shaped tube holder 24 is constructed of a material which is flexible and strong so as to allow the tube holder 24 to conform to accommodate the pivotal pin 50 and withstand stress forces. The first end of the pivotal frame 40 is provided with a third C-shaped tube holder 60 with a slot 62 facing downward. A radial stop boss 52 is provided on a wall of the pivotal pin 50 and slants to the first end of the frame 40 in a direction the third C-shaped tube holder 60 faces at a position corresponding to the groove 28 of the C-shaped tube holder 24. Further, the pivotal pin 50 has two ends each of which is defined with a stop block 54, 56. The blocks 54, 56 are respectively provided with a roughened surface 58' and 58" for increasing a friction force between the standing device and the ground.

As shown in FIG. 2, a stroller 150 having an upper cross bar 65, a lower cross bar 70, and two rear wheels 66, 67 is partially shown. The C-shaped tube holder 60 of the pivotal frame 40 is pivotally connected to the upper cross bar 65 while the C-shaped tube holder 22 of the pivotal rod 20 is pivotally connected to the lower cross bar 70. As shown, when the stroller 150 is in a collapsed position, a distance between the upper cross bar 65 and the lower cross bar 70 is shortened, the pivotal rod 20 and the pivotal frame 40 are folded downward to support the stroller 150 in cooperation with the rear wheels 66, 67.

Figure 3:
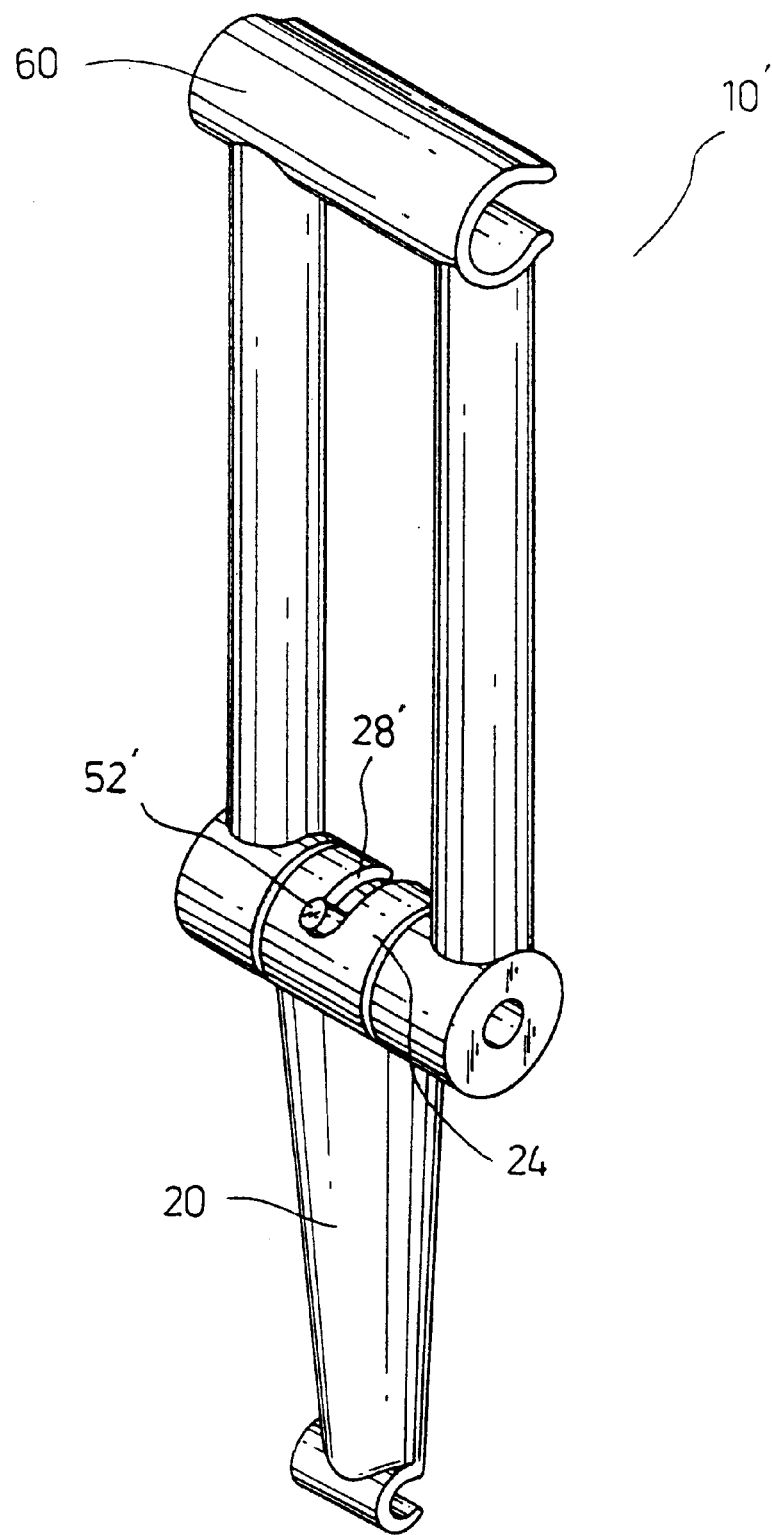
FIG. 3 shows a perspective view of a standing device in accordance with a second embodiment of the present invention.
Figure 4:
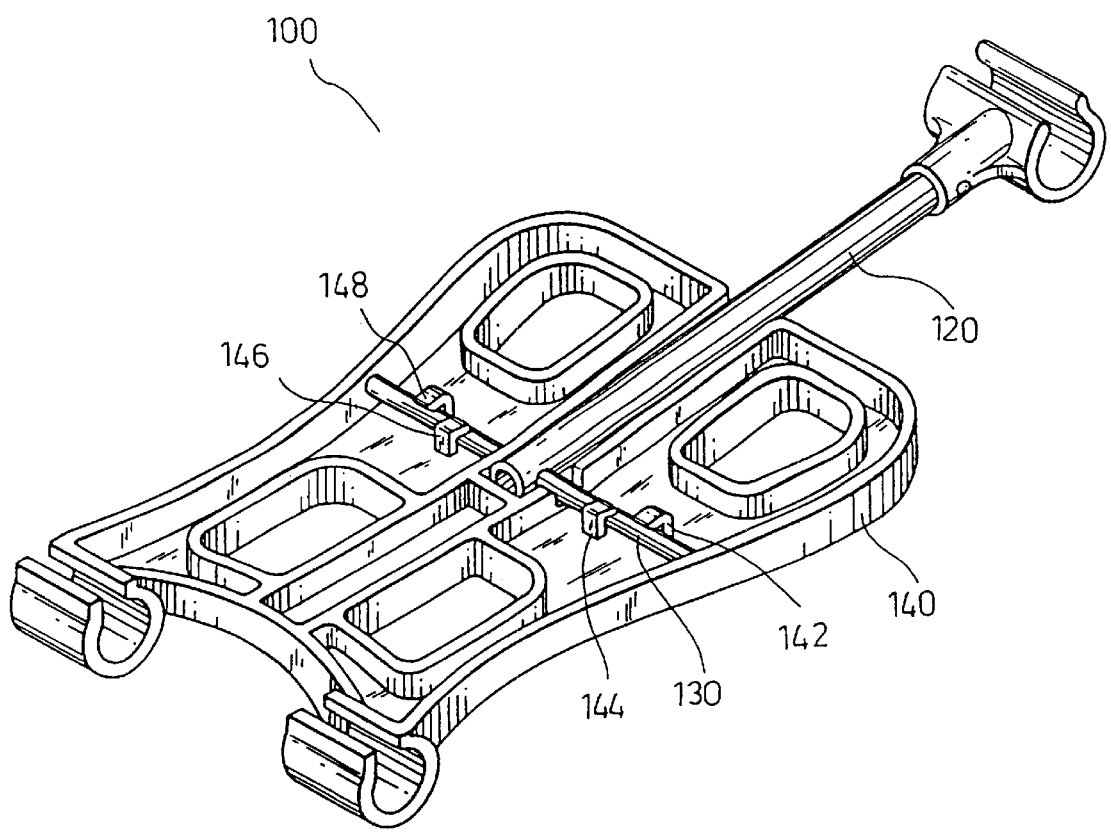
FIG. 4 shows a perspective view of a conventional standing device.

FIG. 3 shows another embodiment of the standing device 10' in accordance with the present invention which is almost identical to the standing device 10 shown in FIG. 1 except that a stop boss 52' slants in an opposite direction the third C-shaped tube holder 60 faces and a groove 28' is provided at the C-shaped tube holder 24 on a wall opposite-facing the pivotal rod 20.

It will be apparent to those skilled in the art that various modifications and variations can be made in the device of the present invention. The present invention covers such modifications and variations as defined by the scope of the appended claims and their equivalents.

What is claimed is:

1. A standing device for a collapsible stroller of the type having an upper cross bar, a lower cross bar, and two rear wheels, the standing device comprising:

a pivotal rod having a first end that includes a first C-shaped tube holder, and having a second end that includes a second C-shaped tube holder; and a pivotal frame having a first end including a third C-shaped tube holder, and having a second end including a pivotal pin having a radial stop boss slanting toward said first end of said pivotal frame, wherein:

said second C-shaped tube holder is sized to engage with and pivotally connect to said pivotal pin of said pivotal frame;

said first C-shaped tube holder is sized and formed from a material sufficiently resilient to self-attach to the lower cross bar of a collapsible stroller without use of an attachment component; and said third C-shaped tube holder is sized and formed from a material sufficiently resilient to self-attach to the upper cross bar of a collapsible stroller without use of an attachment component;

when attached to a collapsible stroller having rear stroller wheels, said pivotal rod and said pivotal frame fold and support the collapsible stroller in cooperation with said rear stroller wheels when the collapsible stroller is in a collapsed upright position.

2. A standing device according to claim 1, wherein:

said radial stop boss and said third C-shaped tube holder face in a common direction; and said second C-shaped tube holder includes a wall abutting said pivotal rod, said wall defining a groove to receive said stop boss when said pivotal rod and said pivotal frame fold.

3. A standing device according to claim 1, wherein:

said radial stop boss faces a first direction, and said third C-shaped tube holder faces a second opposite direction; and said second C-shaped tube holder including a wall defining a groove opposite-facing said pivotal rod to receive said stop boss when said pivotal rod and said pivotal frame unfold.

4. A standing device according to claim 1, wherein:

said pivotal pin includes first and second ends, each end having a roughened friction-enhancing surface, said ends forming a stop block.

\* \* \* \* \*